C. K. WELCH.
WHEEL OF ROAD VEHICLES.
APPLICATION FILED JUNE 9, 1906.
1,076,178.
Patented Oct. 21, 1913.
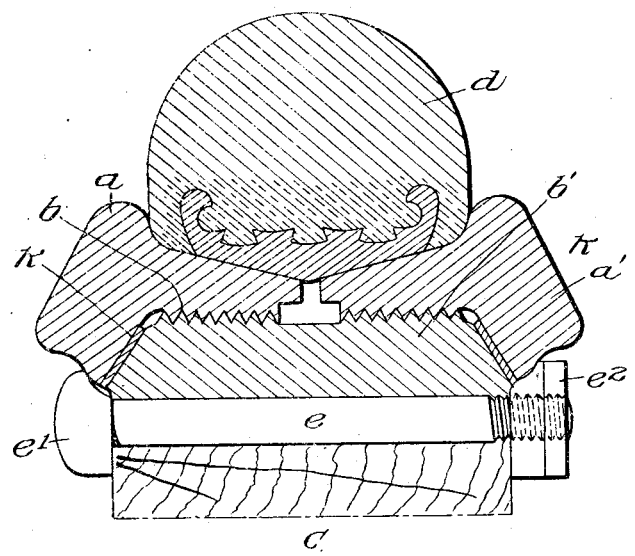
INVENTOR
Charles Kingston Welch
WITNESSES
BY
ATTORNEY

UNITED STATES PATENT OFFICE.

CHARLES KINGSTON WELCH, OF COVENTRY, ENGLAND.

WHEEL OF ROAD-VEHICLES.

1,076,178.　　　　Specification of Letters Patent.　　Patented Oct. 21, 1913.

Application filed June 9, 1906. Serial No. 320,946.

*To all whom it may concern:*

Be it known that I, CHARLES KINGSTON WELCH, a subject of the King of Great Britain, residing at Park House, Coventry, in the county of Warwick, England, engineer, have invented certain new and useful Improvements in and Relating to the Wheels of Road-Vehicles, of which the following is a specification.

This invention relates to the wheels of road vehicles especially wheels of the kind that are used with automobiles and other vehicles of a heavy character and that are provided with detachable india rubber tires of the solid or pneumatic type. Much difficulty is usually experienced in rigidly attaching tires of this kind to their wheels and also in detaching them when it becomes necessary to do so for repairing or renewing the same. If they be of the solid rubber type having a cross sectional shape requiring them to be forced under heavy pressure into a channel shaped rim of which the mouth or flanges are contracted in some instances, their removal can only be effected by the employment of mechanical appliances which the ordinary user does not possess, thus necessitating the removal of the wheel from the vehicle and its despatch to the manufacturer.

If the tires be of the solid rubber type furnished with one or more inextensible cores or bands of rigid material embedded in their base and be held in place by detachable annular flanges of the kind now in vogue, difficulties are experienced in attachment in such a manner as to obviate the tendency to slip or creep on the wheels. When these movements take place the tires either work themselves loose or the material worn away by the friction collects in places between the tires and rims causing them to become so rigidly fixed that it is often necessary to cut them in pieces in order to remove the same. Further, if the tires be of the pneumatic or cushion type held to the rim by inextensible wires or cores or by enlarged edges, the heavy character which the tire must necessarily possess, operates to prevent its being easily manipulated in order to bring the inner edges over the rim in the act of detaching the said tire.

It is the chief object of my invention to enable the wheels to be so constructed that the above stated difficulties will be either overcome or diminished, so that the tires can be much more conveniently detached from and attached to the wheels than heretofore.

According to this invention it is proposed to construct the rim of the wheel in two parts or rings which are adapted for attachment to or detachment from the wheel or the like by screwing so that the necessary holding effect is obtained as regards the tire and a convenient and expeditious means of removing and replacing the tire afforded.

In order that the said invention may be clearly understood and readily carried into effect, I will proceed to describe the same with reference to the drawing which represents one example of the various modes of constructing a vehicle wheel adapted to effect the proposed objects.

The drawing shows a transverse section of a portion of a vehicle wheel whereof the rim is shown as constructed in two parts, each being screw threaded for application to a similarly screw threaded surface on the wheel.

According to the construction illustrated, it is proposed to make the wheel rim in the form of a pair of flanged rings $a$ $a'$ and to provide their surfaces that lie contiguous to the wheel body with screw threads, one thread (that on $a'$) being right handed and the other (that on $a$) left handed. The surface $b$ of the wheel that carries the flanged rings is also provided with right and left handed screw threads to correspond with those of the flanged rings. The surface $b$ may be formed on a ring or annular support $b'$ adapted to fit snugly upon the felly $c$ of the wheel, said ring $b'$ and felly $c$ thus forming a wheel body upon which said rim is mounted and carried. Having placed the flanged rings $a$ $a'$ upon the wheel with the tire $d$ between them and brought the said rings into frictional engagement with the tire, the rings and tire are revolved together; the rings being thereby caused to approach each other and firmly grip the tire, their gripping action taking place without any appreciable angular motion between the tire and the flanged rings; that is to say, the said rings $a$ $a'$ will move transversely but not circumferentially relatively to the tire. The resistance which the rubber surface of a tire exerts to the movement of a body relatively thereto when tightly bearing against it, operates in my arrangement to powerfully resist the unscrewing of the flanged rings so that the tire remains securely held in place. In some cases, it may be found desirable to provide additional means in the form of bolts, screws, clips, keys, links or other appropriate contrivances for positively locking or restraining the movement of the flanged rings on the wheel.

In the drawing is shown a bolt adapted to effect the locking above referred to. The bolt $e$ is formed with a head $e'$, adapted to take a firm bearing against the felly and the rim, the bolt being securely held in position by the nut $e^2$. Upon unscrewing the nut $e^2$ and knocking the bolt a sufficient distance through the wheel, the bolt will be rendered free to be turned so as to release the head $e'$ from engagement with the portion of the ring against which it normally rests; the ring portions being thus rendered free to be screwed off the wheel.

I wish it to be understood that the aforesaid flanged rings $a$ $a'$ may be made of any desired shape in cross-section. They may be made with their surfaces upon which the inner side of the tire rests, of conical or inclined form as shown in the drawing, in which case they will tend to force the tire outwardly as said rings approach each other and in that way will more firmly secure the tire to the wheel by exerting radial outward pressure upon inextensible wires, bands or the like embedded in said tire, as for instance in the case of tires, such as illustrated in the drawing. I may also provide for the insertion of a ring or packing $k$ of vegetable fiber, asbestos, rubber, or other suitable material for keeping wet or moisture from reaching the threads. When the tires employed are of the segmental kind I may make the said flanged rings with cavities or projections or the like for engaging with correspondingly formed parts on the rubber segments. Or connecting stems or bolts extending through the rings and the rubber segments may be employed.

The tires used with my wheel may be of various types. For instance they may be of the clencher form with or without inextensible wires, bands or the like embedded in their edges. Or they may be made with convex or double inclined bases furnished with inextensible wires or the like near their edges and at the crest of their convexity or the apex of their inclinations, in which case they would be very suitable for use with the aforesaid conical or inclined form of the flanged rings. Thus there may be one, two, three or other number of such wires. When the reinforcing band or the like is of metal and lies against the surface of the rings there may be interposed between the two surfaces a fabric or suitable material. The core, if solid, may be formed of inferior rubber. The core may be vulcanized with the tire. A tire of the pneumatic type may also be employed with my invention.

What I claim and desire to secure by Letters Patent of the United States is:—

1. A wheel for vehicles, comprising a wheel body having right and left hand threads upon opposite sides of the periphery thereof respectively, and having beveled edges, a ring threaded upon each side of said periphery having a conical outer surface, and the outer edges of the rings having flanges extending radially in opposite directions, a tire held between the outer conical surfaces and the outwardly extending flanges of said rings, and packing rings between the said inwardly extending flanges and the beveled edges of said wheel body.

2. A wheel for vehicles, comprising a wheel body having right and left hand threads upon opposite sides of the periphery thereof respectively, and having beveled edges, a ring threaded upon each side of said periphery having a conical outer surface, and the outer edges of the rings having flanges extending radially in opposite directions, a tire held between the outer conical surfaces and the outwardly extending flanges of said rings, packing rings between the said inwardly extending flanges and the beveled edges of said wheel body, and a locking bolt passing through said wheel body and engaging against the outer surfaces of the inwardly extending flanges of said ring.

In testimony whereof I have hereunto set my hand in presence of two subscribing witnesses this 25th day of May 1906.

CHARLES KINGSTON WELCH.

Witnesses:
  PHILIP EARDLEY WILKS,
  GEORGE HENDLEY.